United States Patent
Bamberg et al.

(10) Patent No.: US 9,102,003 B2
(45) Date of Patent: Aug. 11, 2015

(54) METHOD FOR JOINING COMPONENTS

(75) Inventors: Joachim Bamberg, Dachau (DE); Alexander Gindorf, Schwabhausen (DE); Herbert Hanrieder, Hohenkammer (DE)

(73) Assignee: MTU Aero Engines GmbH, Munich (DE)

( * ) Notice: Subject to any disclaimer, the term of this patent is extended or adjusted under 35 U.S.C. 154(b) by 935 days.

(21) Appl. No.: 13/062,938

(22) PCT Filed: Aug. 11, 2009

(86) PCT No.: PCT/DE2009/001141
§ 371 (c)(1), (2), (4) Date: Jun. 3, 2011

(87) PCT Pub. No.: WO2010/028616
PCT Pub. Date: Mar. 18, 2010

(65) Prior Publication Data
US 2011/0226755 A1    Sep. 22, 2011

(30) Foreign Application Priority Data
Sep. 11, 2008 (DE) .......... 10 2008 046 742

(51) Int. Cl.
*B23K 13/01* (2006.01)
*B23P 15/00* (2006.01)
*F01D 5/34* (2006.01)

(52) U.S. Cl.
CPC .............. *B23K 13/015* (2013.01); *B23K 13/01* (2013.01); *B23P 15/006* (2013.01); *F01D 5/34* (2013.01); *B23K 2201/001* (2013.01); *B23K 2203/08* (2013.01); *B23K 2203/14* (2013.01); *F05D 2230/23* (2013.01); *F05D 2230/232* (2013.01);

(Continued)

(58) Field of Classification Search
CPC ............... H01L 2924/00; B29C 65/00; F05D 2230/232; F05D 2230/23; B23K 13/00; B23K 13/01; B23K 13/015; B23K 13/02
USPC ........... 219/117.1, 121.64, 617, 603–612, 56, 219/56.22, 59.1; 228/110.1, 112.1, 115, 228/116, 141.1, 153, 164
See application file for complete search history.

(56) References Cited

U.S. PATENT DOCUMENTS 3,779,446 A * 12/1973 Lemelson .................... 228/15.1
4,535,214 A *  8/1985 Meyer et al. ................. 219/60.2
(Continued)

FOREIGN PATENT DOCUMENTS

DE     38 14 102 A1    11/1989
DE     198 58 702 A1    6/2000
(Continued)

*Primary Examiner* — Dana Ross
*Assistant Examiner* — Lindsey C Teaters
(74) *Attorney, Agent, or Firm* — Crowell & Moring LLP

(57) ABSTRACT

A method for joining at least two components by inductive high-frequency pressure welding is disclosed. The first component has a first material structure with a first hardness and the second component has a second material structure with a second hardness which is smaller than the first hardness. Both components are inductively heated in the region of the joining surfaces and are subsequently pressed together by a compressive force. The joining surface of the first component with the first hardness, which is greater than the second hardness of the second component, is pre-contoured in a spherical, conical or convex manner prior to joining the two components.

7 Claims, 1 Drawing Sheet

(52) U.S. Cl.
CPC ....... *F05D 2250/70* (2013.01); *F05D 2250/711* (2013.01); *F05D 2300/506* (2013.01); *Y02T 50/671* (2013.01)

(56) References Cited

U.S. PATENT DOCUMENTS

2006/0174482 A1* 8/2006 Roedl et al. .................. 29/889.1
2009/0028711 A1* 1/2009 Hanrieder et al. ........ 416/213 R
2009/0290985 A1* 11/2009 Hanrieder et al. ........ 416/213 R

FOREIGN PATENT DOCUMENTS

| DE | 102006012661 | * | 9/2007 | |
| DE | 102006012662 | * | 9/2007 | ............ B23K 13/01 |
| EP | 0 753 359 A1 | | 1/1997 | |
| JP | 8-141752 | | 6/1996 | |
| WO | WO 2004/012896 A1 | | 2/2004 | |

* cited by examiner

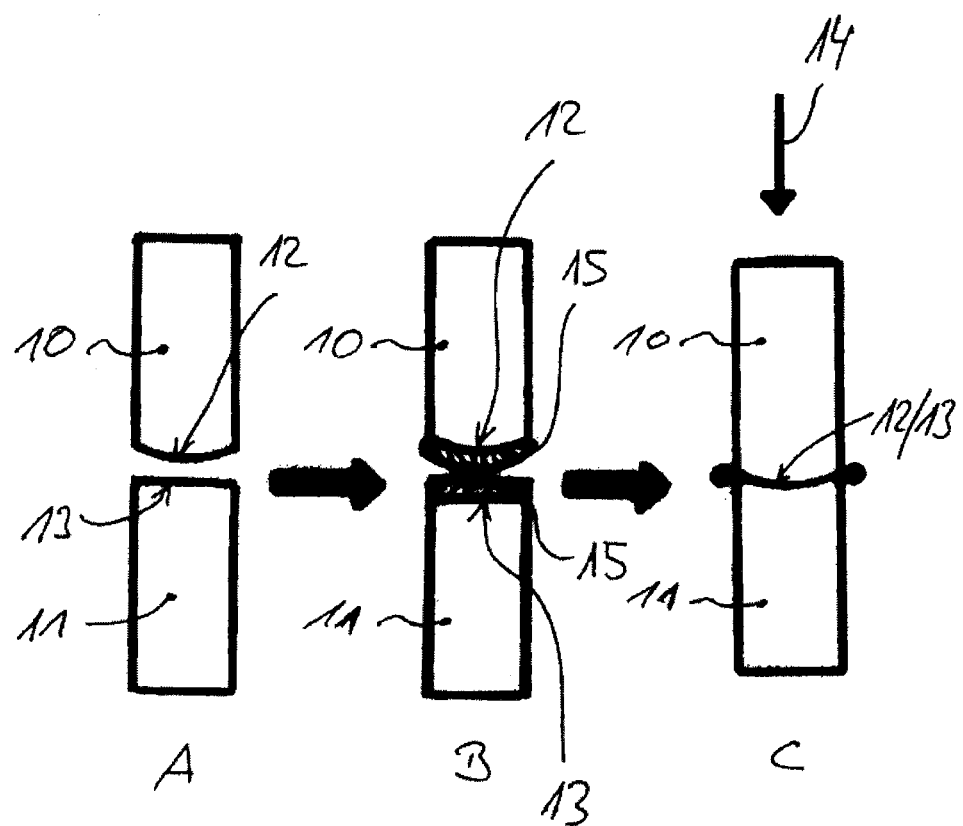

METHOD FOR JOINING COMPONENTS

This application claims the priority of International Application No. PCT/DE2009/001141, filed Aug. 11, 2009, and German Patent Document No. 10 2008 046 742.1, filed Sep. 11, 2008, the disclosures of which are expressly incorporated by reference herein.

BACKGROUND AND SUMMARY OF THE INVENTION

The invention relates to a method for joining components.

Modern gas turbines, particularly aircraft engines, must meet extremely high demands with regard to reliability, weight, power, economy and service life. In the last few decades, aircraft engines that fully meet the requirements listed above and have achieved a high level of technical perfection have been developed, especially in the civilian sector. The choice of materials, the search for suitable new materials and novel production methods, among other things, plays a decisive role in the development of aircraft engines. The most important materials used nowadays for aircraft engines or other gas turbines are titanium alloys, nickel alloys and high strength steels. High strength steels are used for shaft parts, gear parts, the compressor housing and the turbine housing. Titanium alloys are typical materials for compressor parts. Nickel alloys are suitable for the hot parts of the aircraft engine. Precision casting and forging are the primary production methods known from the prior art as production methods for gas turbine components made of titanium alloys, nickel alloy or other alloys. All highly stressed gas turbine components such as, for example, the blades for a compressor, are forged parts. However, rotor blades and guide blades of the turbine are usually designed as precision cast parts.

When producing, for example, integrally bladed gas turbine rotors, it is necessary to join components with one another that differ in terms of their material structure as well as their hardness. Joining these types of parts is normally accomplished in practice using inductive high-frequency pressure welding, wherein, in the case of inductive high-frequency pressure welding, components to be joined with one other are inductively heated in the region of the joining surfaces of the components in order to melt the material structure, and wherein after the melting, the components to be joined with one another are pressed together or compressed by applying a compressive force. Particularly when, for example, a cast component is supposed to be joined to a forged component, wherein the cast component has a greater hardness than the forged component, completely removing the melted material from the joining region when pressing the components together presents difficulties in the case of inductive high-frequency pressure welding.

This can result in the formation of grain boundary incipient melting, which has a negative impact on the so-called HCF strength of the joint, because such grain boundary incipient melting can be the starting point for microscopic cracks. As a result, there is a need for a method for joining these types of components by means of inductive high-frequency pressure welding, in which there is no danger of grain boundary incipient melting occurring in the region of the joint.

Reference is made by way of example to German Patent Document No. DE 198 58 702 A1 as the prior art, which discloses inductive high-frequency pressure welding as a joining method for gas turbine components.

Starting from here, the present invention is based on the objective of proposing a novel method for joining components.

According to the invention, the joining surface of the first component having the first hardness, which is greater than the second hardness of the second component, is pre-contoured in a spherical, conical or convex manner prior to joining the two components.

In terms of the invention, the harder component of the components to be joined to one another is pre-contoured in the region of its joining surface in a spherical, conical or convex manner so that, with the application of the compressive force during inductive high-frequency pressure welding, a complete displacement of the melted material from the joining region of the components being joined with one another is possible. As a result, all liquid phase components can be reliably removed from the joining region so that no grain boundary incipient melting is able to occur in the joining region. The joining region between the components is therefore the same as a forged structure, which has good HCF strength.

Preferred further developments of the invention are yielded from the subsequent description. Without being restricted hereto, exemplary embodiments of the invention are explained in greater detail on the basis of the drawing.

BRIEF DESCRIPTION OF THE DRAWING

FIG. 1 is a schematic representation for clarifying the method according to the invention for joining two components.

DETAILED DESCRIPTION OF THE DRAWING

The present invention relates to a method for joining components, particularly gas turbine components, wherein the method according to the invention is described in detail in the following making reference to the schematic representation of FIG. 1.

FIG. 1 shows in a very schematic manner two components 10, 11 to be joined to one another in different states A, B and C, wherein this component 10 is a component having a first material structure with a first hardness and the component 11 is a component having a second material structure with a second hardness, wherein the second hardness of the second material structure of the component 11 is smaller than the first hardness of the first material structure of the component 10.

The two components 10, 11 having the different material structures or hardnesses are supposed to be joined to one another by inductive high-frequency pressure welding in terms of the method according to the invention, wherein, in the case of inductive high-frequency pressure welding, the two components 10, 11 are inductively heated in the region of the joining surfaces 12, 13 in order to melt the material structure in the region of the joining surfaces 12, 13, wherein, after melting the material structure in the region of the joining surfaces 12, 13, the two components 10, 11 are pressed together or compressed by a compressive force 14. Melted sections of the material structure in the region of the joining surfaces 12, 13 are identified by reference number 15 in state B of FIG. 1.

As is evident from state A of FIG. 1, in terms of the method according to the invention, the joining surface 12 of the component 10 having the first hardness, which is greater than the second hardness of the second component 11, is pre-contoured in a spherical, conical or convex manner prior to joining the two components 10, 11. However, the joining surface 13 of the component 11 having the second hardness, which is smaller than the first hardness of the first component 10, is pre-contoured in a flat manner according to state A of FIG. 1.

The components 10, 11 pre-contoured with these types of joining surfaces 12, 13 are, as already mentioned, inductively heated to melt the material structure in the region of the joining surfaces 12, 13 (see state B in FIG. 1), wherein subsequently, according to state C of FIG. 1, the components 10, 11 are pressed together or compressed by the application of compressive force 14, wherein the melted material is completely pressed out of the joining region between the components 10, 11 in the process.

Consequently, the liquid phase component is completely removed from the welding zone of the two components 10, 11 so that there is no danger that grain boundary incipient melting that could have a negative impact on the HCF strength in the region of the joining zone or the welding zone occurs.

In the case of the component 10, which has the greater hardness, it is preferably a component made of a monocrystalline material structure or of a directionally solidified material structure, i.e., a cast part. On the other hand, in the case of component 11, which has the lower hardness, is preferably a forged component.

Both components 10, 11 to be joined with one another are preferably made of a nickel-based material, in particular of a nickel-based alloy. However, it is also possible for the components 10, 11 to be joined with one another to be made of nickel-based alloys and/or titanium-based alloys and/or cobalt-based alloys.

The joining surfaces 12, 13 of the components 10, 11 to be joined with one another are inductively heated at least prior to the application of the compressive force 14 in order to melt the material structure in the region of the joining surfaces 12, 13. According to an advantageous further development of the invention, it may be provided that the inductive heating also be maintained during the application of the compressive force 14 and therefore after the first mechanical contact of the joining surfaces 12, 13.

The method according to the invention is preferably used for producing integrally bladed gas turbine rotors, i.e., when rotor blades are supposed to be joined to a rotor base body through inductive high-frequency pressure welding. In this case, it is then possible for each rotor blade to form a component 10, which has the greater hardness than a rotor base body, which then provides the component 11. However, it is also possible in this case that each rotor blade forms the component 11 with the lower hardness, wherein then the rotor base body is the component 10 with the greater hardness.

When producing these types of integrally bladed gas turbine rotors, the rotor blades can be joined using the method according to the invention either directly to the rotor base body or indirectly to the rotor base body with the interconnection of an adapter.

In this case, first the adapters are joined to the rotor base body and then the rotor blades to the adapters, which are already fastened to the rotor base body, by means of the method according to the invention.

It is possible with the method according to the invention to produce a defect-free material structure in the region of a joining zone or a welding zone of components that are to be joined to one another, which differ in terms of their material structure and their hardness. Thus, a forged structure can be provided in the region of the welding zone or the joining zone without grain boundary incipient melting which possesses high HCF strength.

The invention claimed is:

1. A method for joining components by inductive high-frequency pressure welding, comprising the steps of:
    pre-contouring a joining surface of a cast component in a spherical, conical, or convex manner, wherein a distal-most portion of the spherical, conical, or convex joining surface is located at a center of the joining surface;
    pre-contouring a joining surface of a forged component in a flat manner;
    inductively heating the cast component in a region of the joining surface of the cast component and the forged component in a region of the joining surface of the forged component, wherein the cast component has a first material structure with a first hardness and wherein the forged component has a second material structure with a second hardness which is smaller than the first hardness;
    pressing the components together after the step of inductively heating by a compressive force; and
    displacing a melted material from a joining region of the components by the pre-contoured joining surface of the cast component via the pressing.

2. The method according to claim 1 wherein the cast component has a monocrystalline material structure.

3. The method according to claim 1 wherein the cast component has a directionally solidified material structure.

4. The method according to claim 1 wherein the cast component and the forged component are respectively made of a nickel-based material.

5. The method according to claim 1 wherein both of the components are inductively heated in the regions of the joining surfaces before and during the step of pressing.

6. The method according to claim 1 wherein the cast component is a rotor blade of a gas turbine rotor and wherein the forged component is a rotor base body of the gas turbine rotor.

7. The method according to claim 1 wherein the forged component is a rotor blade of a gas turbine rotor and wherein the cast component is a rotor base body of the gas turbine rotor.

* * * * *